United States Patent [19]
Zare-Ardestani

[11] Patent Number: 5,209,620
[45] Date of Patent: May 11, 1993

[54] FASTENER WITH DIFFERENTIALLY INCLINED AXES

[75] Inventor: Vahid Zare-Ardestani, Corona, Calif.

[73] Assignee: VSI Corp., Carson, Calif.

[21] Appl. No.: 751,034

[22] Filed: Aug. 28, 1991

[51] Int. Cl.⁵ .......... F16B 37/00; F16B 37/02; F16B 37/04; B21D 39/00
[52] U.S. Cl. .............................. 411/104; 411/112; 411/166; 411/173; 411/354; 403/408.1; 29/456
[58] Field of Search .............. 411/103, 104, 105, 108, 411/112, 113, 173, 177, 180, 182, 354, 368, 402, 403; 403/4, 351, 408.1; 29/456, 525.1

[56] References Cited
U.S. PATENT DOCUMENTS

| | | | |
|---|---|---|---|
| 2,430,613 | 11/1947 | Hodge | 411/403 |
| 3,008,368 | 11/1961 | Hammitt et al. | 411/368 |
| 3,177,916 | 4/1965 | Rosan | 411/103 |
| 3,835,615 | 9/1974 | King, Jr. | 52/758 D |
| 4,498,271 | 2/1985 | Koniger et al. | 411/104 X |
| 4,732,518 | 3/1988 | Toosky | 411/108 |
| 4,815,907 | 3/1989 | Williamson et al. | 411/107 |

Primary Examiner—Neill R. Wilson
Attorney, Agent, or Firm—Pretty, Schroeder, Brueggemann & Clark

[57] ABSTRACT

A fastener, to be inserted into a receiving hole in a panel, has a cylindrical body with a longitudinal axis and a straight bore through the body with an axis that is inclined relative to the axis of the body. In another type of fastener, the fastener has a body formed of cylinders that are joined end-to-end and have axes that are inclined relative to each other. One cylinder is a right cylinder. A straight bore passes through both cylinders such that the bore axis is aligned with the right cylinder. Generally, the axis of the straight bore is perpendicular to the panel surfaces and the axis of the inclined cylinder is inclined at between 5° and 60° relative to the bore axis. The axis of the receiving hole is aligned with the axis of the inclined cylinder. When the fastener is inserted into the panel, the inclination of the receiving hole cooperates with the fastener body to prevent rotation and provide an axial holding force when a fastener bolt is threaded into the fastener.

18 Claims, 4 Drawing Sheets

FASTENER WITH DIFFERENTIALLY INCLINED AXIS

BACKGROUND OF THE INVENTION

1. Field of the Invention

This invention relates generally to fasteners and, more particularly, to fasteners that coact with a receiving hole in a panel to prevent rotation of the fastener relative to the panel.

2. Description of the Related Art

When fixtures are to be attached to panels, or panels are to be joined together, a mechanical attachment often is preferable to other means of attachment, such as adhesives. Mechanical attachment typically requires less surface preparation than adhesives, and many adhesives can be caustic. Moreover, a mechanical attachment generally can be removed and reinstalled. Mechanical attachment is typically accomplished using a threaded fastener system, such as screws threaded into the panels, or bolts used in combination with threaded fasteners, such as nuts. Sometimes, screws are not desirable or cannot be used. For example, a screw requires that the attachment hole in the panel be threaded, which is a more time-consuming operation than drilling a bolt hole. Some materials, such as composite panels constructed from fibers and hardened resin compounds, cannot be threaded due to their brittleness, and therefore cannot be used with screws.

A difficulty associated with using a bolt and fastener combination is that a fastener typically must be held in place relative to the panel when the bolt is being turned so that the fastener does not rotate as the bolt is being turned. If the fastener has a multi-sided body, then a receiving hole can be provided in the panel, having sides that complement the sides of the fastener body and that cooperate with the sides of the fastener to prevent rotation. The receiving hole in the panel, however, can be very difficult to prepare, especially in the case of brittle, composite panels. Some of these difficulties can be overcome by using fasteners such as plate nuts and press nuts.

A plate nut includes an internally threaded nut body having laterally projecting tabs on its bottom end. Each tab includes an attachment hole that can receive a bolt, rivet, or the like to attach the plate nut to a panel. The plate nut is attached to the panel by drilling three holes in the panel, one of which is aligned with the threaded bore of the nut body and the other two of which are aligned with the attachment holes of the tabs, and by bolting or riveting the plate nut to the panel through the attachment holes. A bolt then can be threaded into the nut body for attachment of a fixture or second panel without having to hold the nut in place during tightening of the bolt. Unfortunately, plate nuts require costly drilling and finishing steps, add weight to the finished assembly, and take up a greater amount of space.

A press nut includes a fastener body having an internally-threaded bore and an annular attachment flange at its bottom end, just below a circumferential groove. The panel to which the press nut is to be attached is prepared by drilling a single hole, larger than the internal bore of the press nut. A drive tool is used to press the nut into the panel and deform the panel material so that some of it flows into the circumferential groove against the flange and holds the nut in place. The press nut does not have to be held in place during tightening of the bolt, requires fewer preparation steps than a plate nut, and is lower in weight and size.

The press nut does have limitations, however. If the panel material is not sufficiently thick or hard, the press nut can pull through the panel as the bolt is being tightened. Because composite panels tend to be relatively brittle, the composite material does not readily flow into the circumferential groove of the press nut. Thus, press nuts are not ordinarily used with composite materials. Finally, it is possible for the torque applied to the bolt during tightening to be sufficient to rotate the press nut in the composite material, eliminating the advantage of one-handed operation.

From the discussion above, it should be apparent that there is a need for a threaded fastener system that prevents a fastener from rotating during installation, that does not require a complicated receiving hole, and that can be used in conjunction with composite panels without pulling through or otherwise damaging the panels. The present invention satisfies these needs.

SUMMARY OF THE INVENTION

The invention provides a fastener that fits into a receiving hole in a panel and that has a generally cylindrical body with a longitudinal axis and with a straight bore that passes through the body such that the axis of the body is inclined relative to the axis of the straight bore. Generally, the axis of the straight bore is perpendicular to the panel and the axis of the cylindrical fastener body is inclined relative to the panel. The receiving hole in the panel can be a straight bore that passes through the panel or can be a hole that is drilled into the panel, in either case having an inclined axis relative to the panel surfaces and aligned with the axis of the cylindrical fastener body. When the fastener is inserted into the panel, the inclined bore of the receiving hole forms an irregular surface that allows the panel to cooperate with the surface of the inclined cylinder to prevent the fastener from rotating in the panel and to provide an axial holding force when a fastening bolt or the like is threaded into the straight bore of the fastener.

In another aspect of the invention, a fastener includes a boss that projects outwardly from one end of the fastener body. That is, the fastener includes two cylinders whose longitudinal axes are inclined relative to each other and that share a common straight bore. Generally, the panel has top and bottom surfaces that are parallel to each other, the axis of the bore is perpendicular to the panel surfaces, the longitudinal axis of one of the cylinders is aligned with the axis of the straight bore, and the axis of the other cylinder is inclined relative to the axis of the bore. The receiving hole in the panel is a straight bore with an axis that is inclined relative to the panel surfaces and that is aligned with the axis of the inclined cylinder. As described above, when the fastener is inserted into the panel, the inclined bore of the receiving hole cooperates with the surface of the inclined cylinder to prevent the fastener from rotating in the panel and to provide an axial holding force when a fastening bolt is threaded into the straight bore of the fastener.

In cross-section, the inclined cylinder and the receiving hole in the panel have the shape of an ellipse. The inclined cylinder of the fastener fits into the receiving hole from the top surface of the panel. For easier insertion into the receiving hole, the upper end of the receiving hole can be countersunk and the upper end of the inclined cylinder can be provided with a flared shoulder. The countersink provides an enlarged area through which the fastener can be inserted and provides a larger seating area for the top end of the inclined cylinder.

The fastener also can be provided as a three-piece assembly, with a fastener body that has a raised wall and a floating nut that is retained by a clip. Thus, the fastener again includes a straight cylinder and an inclined cylinder, but the straight cylinder includes both the raised wall that projects upwardly from the top of the inclined cylinder and forms a recess, and a nut that is received in the recess. The clip retains the nut in the recess with sufficient free movement to accommodate slight misalignment of the hole in mating a panel relative to the fastener body.

Preferably, the raised wall has an annular shape with an internal bore greater than that of the straight bore, forming a shelf on which the nut rests, and includes vertically extending slots. The nut includes projecting tabs that are received in the slots. After the nut is placed in the recess, the clip snaps around the outside of the raised wall such that the nut can move freely to the extent defined by the projecting tabs moving in the slots, the vertical walls of the slots acting to confine the nut against rotation by the tabs pressing against the walls and the clip acting to confine the nut against falling out by the tabs pressing against the shelf of the recess and against the clip. In addition, the clip is removable and reusable when replacement of the nut element is required without removing the entire fastener assembly, especially in the case where the fastener body is installed in the panel using adhesive.

The composition of the panel will influence the construction of the fastener. For example, if the panel is a carbon fiber composite material, then the fastener should be constructed of stainless steel, which prevents galvanic coupling with the carbon fibers that otherwise could cause corrosion of the nut and delamination of the panel.

Other features and advantages of the present invention should be apparent from the following description of the preferred embodiments, taken in conjunction with the accompanying drawings, which illustrate, by way of example, the principles of the invention.

DESCRIPTION OF THE PREFERRED EMBODIMENTS

Figure 1:
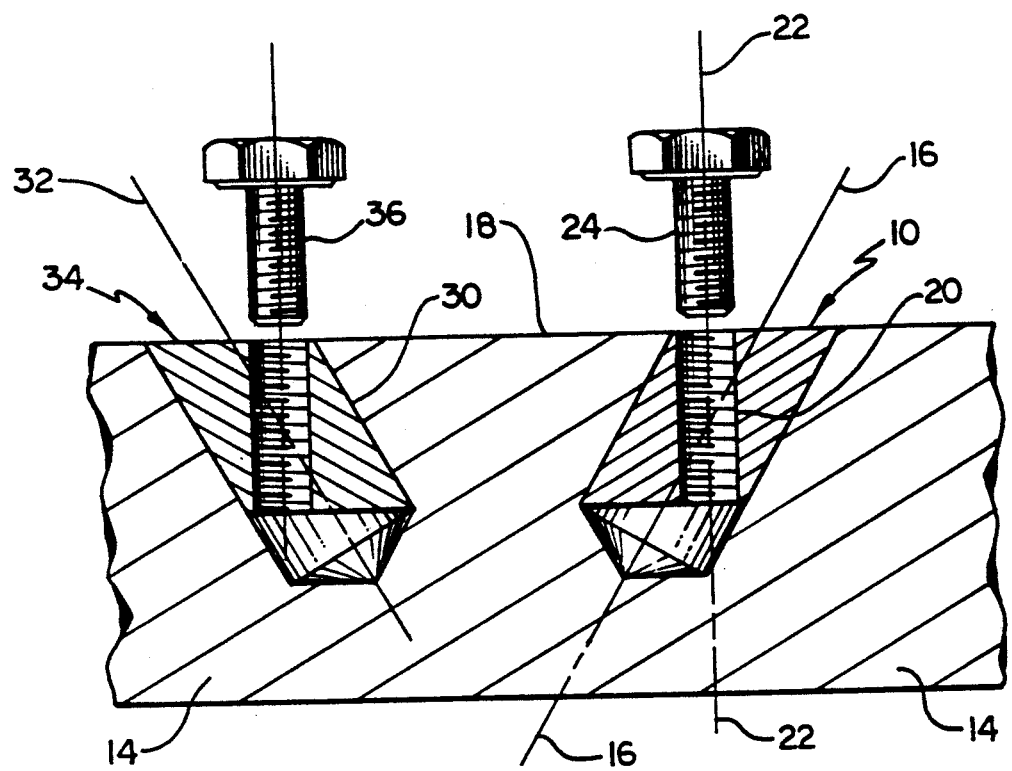
FIG. 1 is a cross-sectional view of a fastener, constructed in accordance with the present invention, in place in a panel.

FIG. 1 shows a fastener 10 constructed in accordance with the present invention after it has been inserted into a receiving hole 12 that has been drilled into a relatively thick panel 14 or fixture. The fastener has the shape of a cylinder with a longitudinal axis 16 that is inclined approximately 45° relative to the top surface 18 of the panel and includes a straight threaded bore 20 having a longitudinal axis 22 perpendicular to the panel. The receiving hole 12 has the same angle of inclination relative to the panel as the inclined axis 16 of the fastener. When the fastener is inserted into the receiving hole 12, the inclination of the receiving hole forms an irregular surface in the shape of an ellipse that cooperates with the surface of the fastener body to prevent the fastener from rotating in the panel and to provide an axial holding force when a fastening bolt 24 or the like is threaded into the fastener.

It might be possible to pull the fastener 10 out of the panel 14 if a force were applied outwardly along the direction of the inclined axis 16. Therefore, to hold the fastener 10 and bolt 24 in place, a second receiving hole 30 having an inclined axis 32 that is oriented so as to oppose the first inclined axis 16 can be provided, and a second fastener 34 can be inserted therein. Together, the fasteners 10 and 34 will resist allowing the other to be pulled out of the panel 14. Alternatively, an external rib, lip, or other fastening mechanism can be provided to keep the first fastener 10 in place. For example, adhesives can be used to lock the fastener into the receiving hole. These and other arrangements for locking the fastener 10 in place can be provided by those skilled in the art.

Figure 2:
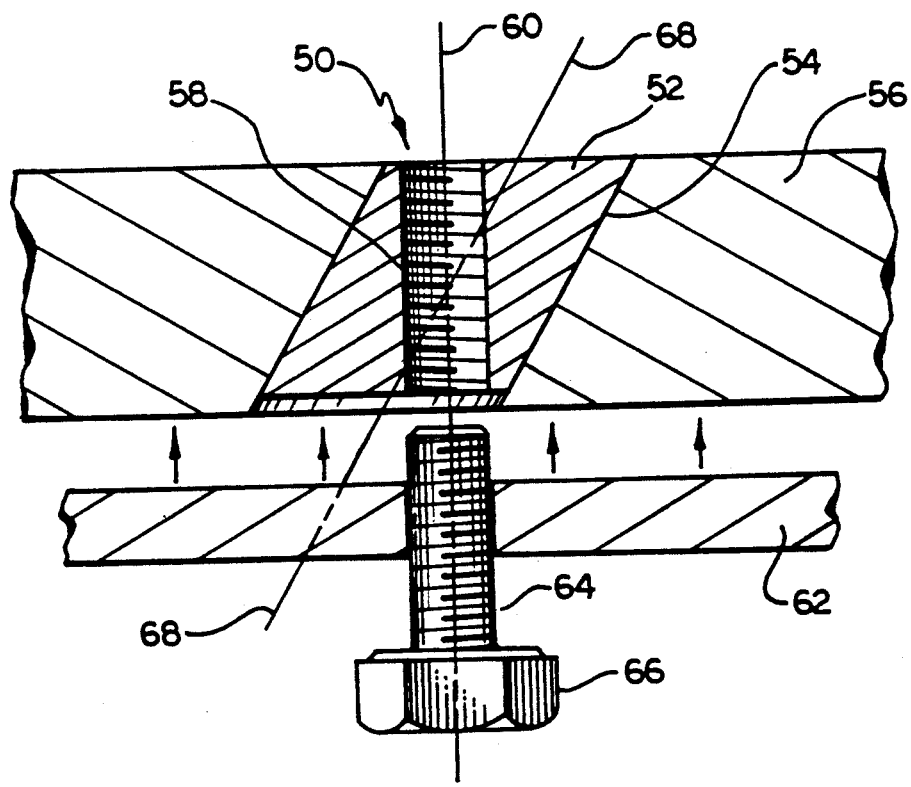
FIG. 2 is a cross-sectional view of another embodiment of a fastener, in place in a panel.

Another embodiment of a fastener 50 constructed in accordance with the present invention is illustrated in FIG. 2. Again, the fastener has an inclined cylindrical body 52 that is inserted into an inclined receiving hole 54 in a panel 56 and that has a threaded straight bore 58 with a longitudinal axis 60. In the case of FIG. 2, however, the receiving hole 54 passes completely through the entire thickness of the panel and the fastener 50 is used to attach a second panel 62 to the first panel 56 using a threaded bolt 64 having a bolt head 66. Again, the inclined axis 68 of the receiving hole forms an irregular surface that cooperates with the surface of the fastener body 52 to preload the fastener such that the fastener will not rotate in the panel 56 when the fastening bolt is threaded into the fastener. Moreover, the axis of the receiving hole cooperates with the fastener body to prevent the body from being pulled through the panel 56 as the bolt is threaded. To provide a tighter fit of the bolt into the threaded fastener, the body of the fastener is recessed slightly from the end of the receiving hole near the bolt head 66, forming a small cavity. This ensures that the second panel 62 will be pulled tightly against the first panel 56 rather than against the bottom of the fastener 50.

Figure 3:
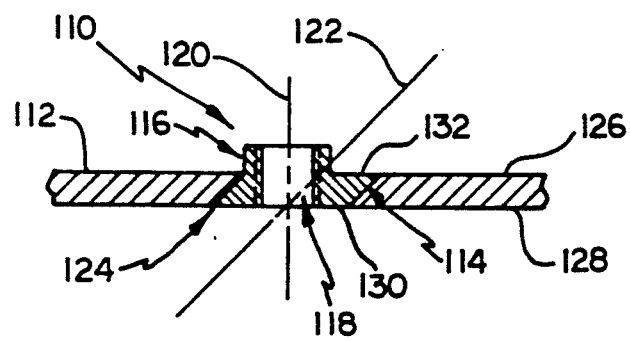
FIG. 3 is a cross-sectional view of another embodiment of a fastener, constructed in accordance with the present invention, in place in a panel.

FIG. 3 shows another embodiment of a fastener 110 in accordance with the present invention after it has been inserted into a panel 112. The fastener has the shape of an inclined cylinder 114 with a boss 116 that projects upwardly from the inclined cylinder. Alternatively, the fastener can be characterized as an inclined cylinder 114 that is joined to a right cylinder 116. The two cylinders include a common threaded bore 118 that passes straight through the cylinders about a longitudinal axis 120. The inclined cylinder has a longitudinal axis 122 inclined 45° relative to the axis 120 of the threaded bore, and the right cylinder has a longitudinal axis that is aligned with the threaded bore axis 120. The panel includes a receiving hole 124 that is inclined relative to the panel top surface 126 and the panel bottom surface 128, and has the same angle of inclination as the inclined cylinder axis 122. When the fastener 110 is inserted into the receiving hole, the inclination of the receiving hole forms an irregular surface that cooperates with the surface of the inclined cylinder 114 to prevent the fastener from rotating in the panel and to provide an axial holding force when a fastening bolt (not illustrated) is threaded into the fastener.

The inclined cylinder 114 has a bottom surface 130, and a top surface 132 that is adapted to fit flush with the top surface 126 of the panel. The irregular surface formed by the inclined axis of the receiving hole 124 is elliptical in cross-section. The axial holding force produced by the bore surface coacting with the inclined cylinder prevents the fastener from rotating once in place. The fastener, however, can be lifted out of the receiving hole with a deliberate force that is directed along the inclined axis 122 so as to pivot the fastener away from the top panel surface 126.

Figure 4:
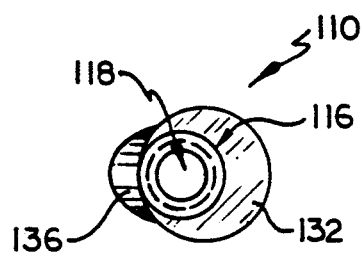
FIG. 4 is a top plan view of the fastener illustrated in FIG. 3.
Figure 5:
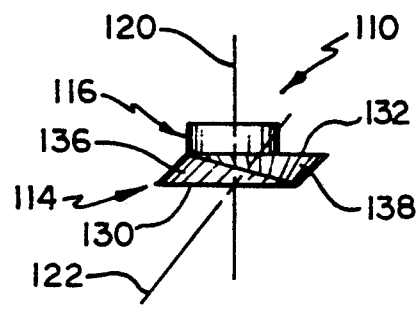
FIG. 5 is an elevational view of the fastener illustrated in FIG. 3.
Figure 6:
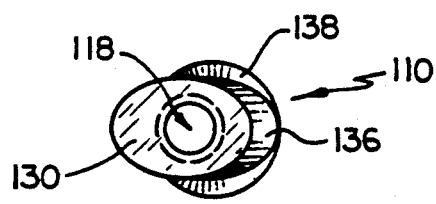
FIG. 6 is a bottom plan view of the fastener illustrated in FIG. 3.

The fastener 110 is illustrated in top, side, and bottom views in FIGS. 4, 5, and 6, respectively. The top end of the inclined cylinder 114 is advantageously provided with a flared shoulder such that the upper surface 132 of the inclined cylinder has a circular shape in plan view (FIG. 4), and a corresponding shape in the upper panel surface 126 to receive the shoulder is provided by a countersink operation. The flared shoulder provides a larger opening through which the lower end of the fastener passes, and makes it easier to seat the fastener 110 in the receiving hole 124. In FIG. 5, both the side surface 136 of the inclined cylinder 114 and the side surface 138 comprising the shoulder are visible. Both surfaces also are visible in FIG. 6, which also illustrates that the shape of the bottom surface 130 of the fastener 110 assumes an elliptical shape in plan view.

Figures 7, 8:
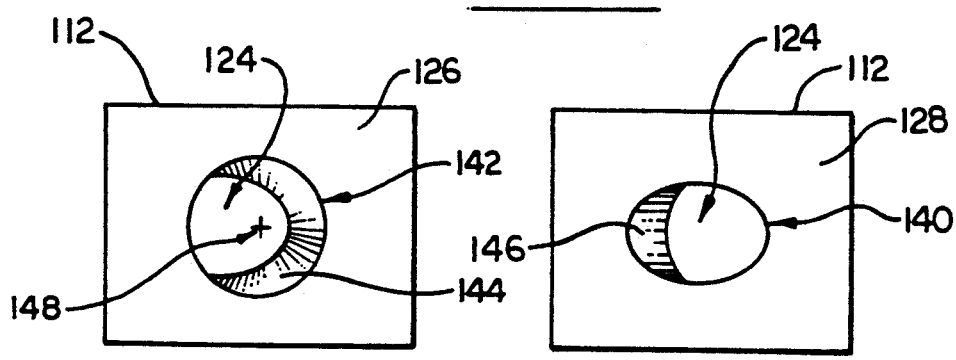
FIG. 7 is a top plan view of the panel illustrated in FIG. 3, with the fastener removed.
FIG. 8 is a bottom plan view of the panel illustrated in FIG. 3, with the fastener removed.

The top view of the panel 112 illustrated in FIG. 7 and the bottom view of the panel illustrated in FIG. 8 show the configuration of the receiving hole 124. The receiving hole is conveniently provided by drilling a hole through the panel 112 along an axis that is aligned with the longitudinal axis 122 of the inclined cylinder 114. This produces a hole whose shape in plan view is an ellipse, as best seen by the ellipse 140 created where the bore ends at the panel bottom surface 128 shown in FIG. 8. As noted above, for easier seating of the fastener 110 within the receiving hole 124, the upper end of the inclined cylinder 114 and of the receiving hole can be given a flared shape. The receiving hole 124 therefore creates a circle 142 where it ends at the panel top surface 126, shown in FIG. 7.

The flared shoulder surface 144 in the panel 112 can be provided easily by a countersink operation. The countersink can be performed by using a drill bit placed at an appropriate location, to be described. The countersink preferably has an included angle equal to twice that of the inclined axis 122. As known to those skilled in the art, a circle is a curve for which the distance from the curve to a center point is a constant, while an ellipse is a curve for which the sum of distances from the curve to each of two focus points is a constant, the ellipse having a major axis and a minor axis. The shoulder 144 at the top end of the receiving hole 124 is provided by a countersink having a center axis 148 shown in FIG. 7 that is aligned with a focus point of the ellipse for the upper end of the receiving hole, farthest from the center axis of the threaded bore 118. In the preferred embodiment, the diameter of the countersink circle 142 at the top panel surface 126 corresponds to the major axis of the ellipse.

As noted, the axis 122 of the inclined cylinder 114, and therefore of the receiving hole 124, is inclined 45° from the axis 120 of the straight cylinder 116. It has been found that angles of inclination in a range from 5° to 60° are satisfactory. Generally, it is desirable to decrease the angle of inclination relative to the axis 120 as the thickness of the panel 112 increases, because the lateral distance of the receiving hole 124 otherwise becomes so great that it becomes difficult to accommodate a straight bore 118 through the panel with a receiving hole of reasonable diameter.

Figure 9:
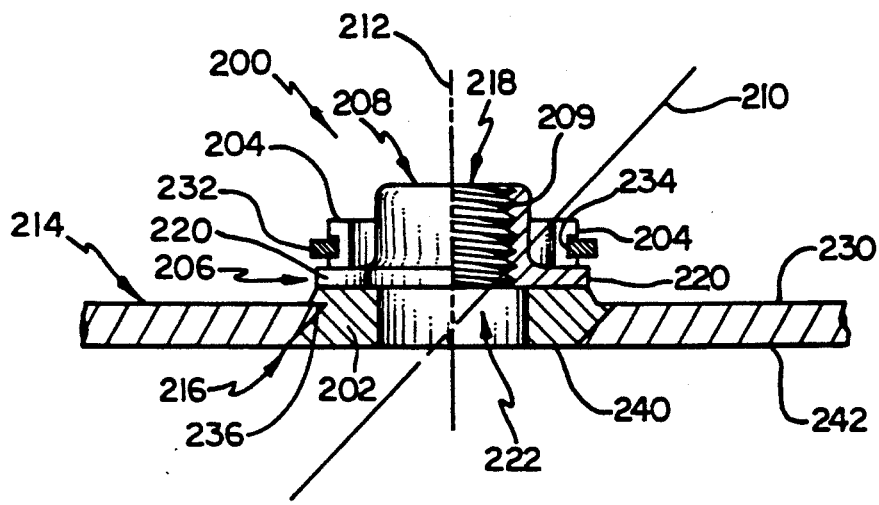
FIG. 9 is a partial elevational/partial cross-sectional view of yet another fastener, constructed in accordance with the present invention, that includes a floating nut.
Figure 10:
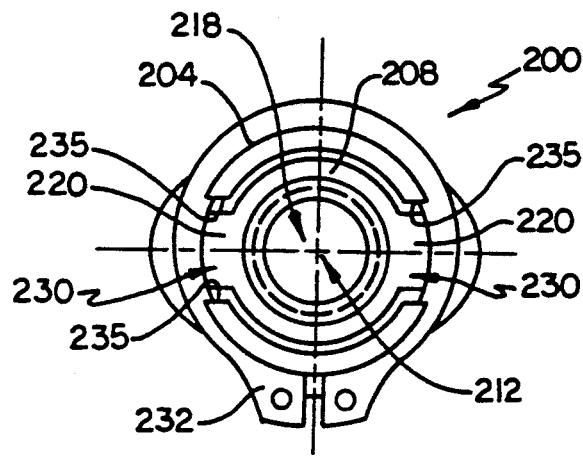
FIG. 10 is a top plan view of the fastener assembly illustrated in FIG. 9.

Yet another embodiment of a fastener 200 in accordance with the present invention is illustrated in partial section, partial elevational view in FIG. 9 and in plan view in FIG. 10, and provides a floating nut construction. The fastener includes an inclined cylinder 202 and a straight cylinder, as in the previous embodiment, except that the straight cylinder is provided by a raised wall 204 adjoining the inclined cylinder, forming a fastener body 206, and a separate nut 208 that has internal threads 209 and that is allowed a limited range of free movement relative to the fastener body while a fastening bolt (not illustrated) is threaded into the nut. As With the previous embodiment illustrated in FIGS. 3–8, the inclined cylinder 202 has an inclined axis 210 and the straight cylinder has an axis 212 that is perpendicular to a panel 214 that receives the fastener in a receiving hole 216. The range of free movement of the nut allows the fastening bolt to be more easily threaded into the nut because any slight misalignment of the bolt relative to the perpendicular axis 212 can be accommodated and the nut will be pulled into alignment as the bolt is threaded into the nut.

Figure 11:
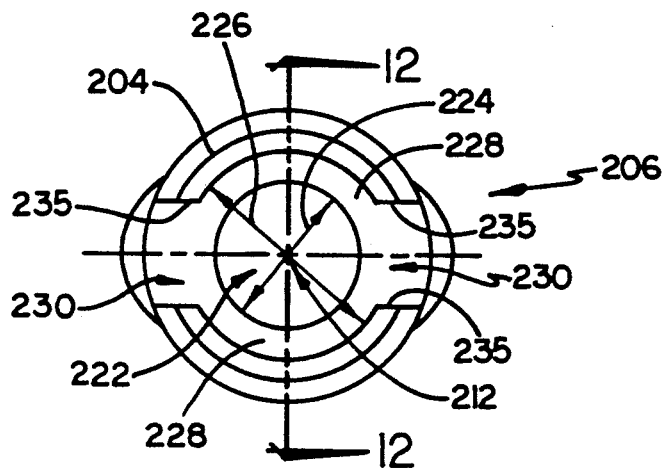
FIG. 11 is a top plan view of the fastener body illustrated in FIG. 9, with the floating nut and clip removed.
Figure 12:
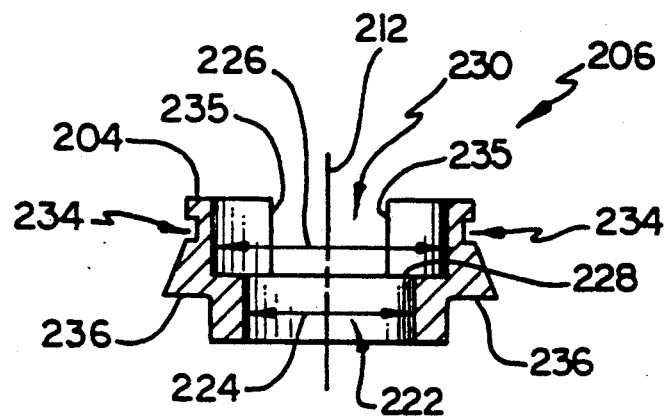
FIG. 12 is a side sectional view of the fastener body illustrated in FIG. 11.
Figure 13:
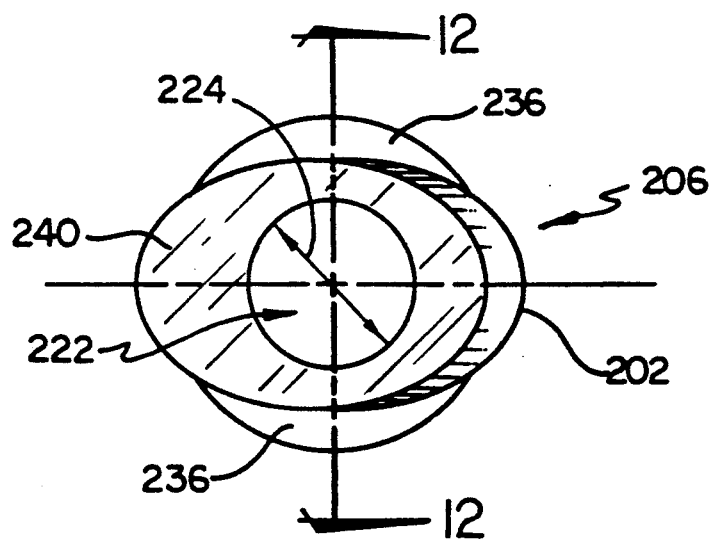
FIG. 13 is a bottom plan view of the fastener body illustrated in FIG. 11.

Retention of the floating nut 208 in the fastener body 206 is best understood with reference to the assembly views of FIGS. 9 and 10 and with reference to the FIG. 11 and FIG. 12 plan and sectional views, respectively, of the fastener body. The floating nut 208 includes a central, threaded bore 218 that is aligned with the straight axis 212 and has two laterally extending tabs 220. The fastener body 206 includes a straight bore 222 having a lower diameter 224 that is approximately equal to the diameter of the threaded bore 218 of the nut and an upper diameter 226 that is larger. The two diameters form a shelf 228 upon which the nut rests. Two vertically extending slots 230 formed in the raised wall 204 allow the nut tabs to pass.

The nut 208 is prevented from falling out of the fastener body 206 by a clip 232 that has an open circle or C-shape such that the clip has a degree of resiliency. A circumferential groove 234 extends around the outside of the raised wall 204. The clip is installed by being snapped around the raised wall and seating in the groove. When the clip 232 is installed, the nut 208 has a limited range of movement but is prevented from falling out of the fastener body 206 by the nut tabs 220 being locked in the slots 230 by the clip. Vertical surfaces 235 in the raised wall 204 that define the slots stop the nut from rotating when the fastening bolt is threaded into the nut by the action of the tabs 220 locking against the vertical surfaces.

Because the clip 232 is resilient, it can be removed from its installed position in the groove 234 and then installed again. Thus, the clip is reusable. This allows the nut 208 to be replaced, such as might be necessary if the threads 209 of the nut are stripped, without removing the entire fastener assembly from the panel 214. The fastener body 206 can remain in the receiving hole 216 when the clip and nut are removed. This is especially advantageous if the fastener body is locked in place in the receiving hole with adhesive.

The bottom portion 236 of the raised wall 204 forms a circular shoulder or ledge that seats against the top surface 238 of the panel 214. For improved strength and increased shoulder area with minimum use of material, the raised wall is provided with a conical shape. As with the previous embodiment, the inclined cylinder 202 and inclined receiving hole 216 in the panel provide complementary irregular shapes that provide an axial load on the fastener 200 that prevents the fastener from falling out of the receiving hole and from rotating when the fastening bolt is threaded into the nut 208.

If the fastener 200 is to be used in a carbon fiber composite panel, then the fastener body 206 should be manufactured from stainless steel to prevent corrosion of the fastener and delamination of the panel 214. The floating nut 208 also should be constructed of stainless steel to prevent galvanic coupling through the fastener body to the panel and subsequent corrosion and delamination, as should the clip 232.

From the foregoing, it will be appreciated that a fastener in accordance with the invention fits into a panel without rotating in the panel when a fastening bolt or screw is threaded into the fastener. Such a fastener includes an inclined cylinder and a straight bore having axes at different angles. A receiving hole in the panel has a longitudinal axis with an inclination that is aligned with the angle of the inclined cylinder. The walls of the receiving hole in the panel coact with the side surfaces of the inclined cylinder to provide rotational resistance that prevents the fastener from rotating while a bolt is being threaded into the fastener, allowing a one-handed fastening operation without complicated panel preparation steps.

The present invention has been described above in terms of presently preferred embodiments so that an understanding of the present invention can be conveyed. There are, however, many configurations for fasteners not specifically described herein, but with which the present invention is applicable. The present invention should therefore not be seen as limited to the particular embodiments described herein, but rather, it should be understood that the present invention has applicability with respect to fasteners in a variety of applications. All modifications, variations, or equivalent arrangements that are within the scope of the attached claims should therefore be considered to be within the scope of the invention.

I claim:

1. A fastener for use with a panel having a top surface and a bottom surface with a receiving hole in the top surface into which the fastener is inserted, wherein:

the fastener has a generally cylindrical body with a longitudinal axis and a straight bore passing therethrough, such that the longitudinal axis of the fastener body is inclined relative to the axis of the straight bore;

the receiving hole has a longitudinal axis that is aligned with the longitudinal axis of the fastener body; and the fastener body has a top end and a bottom end, with the top end forming a substantially continuous plane with the top surface with the panel, and with the straight bore passing through the top end.

2. A fastener as defined in claim 1, wherein the axis of the straight bore is perpendicular to the top surface of the panel.

3. A fastener as defined in claim 1, wherein the fastener body includes a top end and a bottom end, and the top end includes a boss that projects upwardly from the fastener body.

4. A fastener as defined in claim 1, wherein the fastener body includes a top end and a bottom end, and the fastener body further includes a raised annular wall that projects upwardly from the top end, forming a recess; and wherein:

the fastener further includes
   a nut that fits within the recess and
   a removable clip that snaps around the annular wall and retains the nut in the recess.

5. A fastener for use with a panel, the panel having top and bottom surfaces and a receiving hole into which the fastener is inserted, the fastener comprising:

an inclined cylinder having a longitudinal axis that is inclined relative to the top panel surface;

a straight cylinder having a longitudinal axis that is inclined relative to the axis of the inclined cylinder and that adjoins the inclined cylinder; and a fastener bore that passes through the inclined cylinder and the straight cylinder, and that is aligned with the axis of the straight cylinder;

wherein the fastener is adapted for use with a receiving hole in the panel that is an inclined cylindrical hole sized sufficiently large to receive the inclined cylinder and is inclined relative to the top panel surface such that the fastener is received and prevented from rotating within the receiving hole.

6. A fastener as defined in claim 5, wherein the inclined cylinder and straight cylinder together have a top end and a bottom end, and the fastener is adapted to be received in the panel until the top end and bottom end of the fastener are within the panel.

7. A fastener as defined in claim 6, wherein the inclined cylinder includes a flared shoulder such that the top end of the inclined cylinder is a circle whose axis is perpendicular to the top surface of the panel and whose diameter is greater than the diameter of the inclined cylinder.

8. A fastener as defined in claim 6, wherein the axis of the fastener bore is perpendicular to the top surface of the panel.

9. A fastener as defined in claim 8, wherein the straight cylinder comprises a raised wall that projects upwardly from the top end of the panel, perpendicular to the top surface of the panel, and a threaded nut that is enclosed by the wall.

10. A fastener as defined in claim 9, wherein the raised wall includes at least one vertically extending slot and receives the internally-threaded nut, the nut further having a projecting tab such that the slot receives the tab and prevents rotation of the nut relative to the raised wall.

11. A fastener as defined in claim 10, wherein the raised wall includes an external circumferential groove, the fastener further including a resilient clip that snaps around the raised wall such that the clip seats in the groove and locks the tab in the slot against the clip, retaining the nut tab in the slot.

12. A fastener as defined in claim 8, wherein the fastener bore is internally threaded.

13. A fastener as defined in claim 12, wherein the straight cylinder projects upwardly, perpendicular to the top surface of the panel, when the fastener is inserted into the receiving hole.

14. A fastener for use with a panel having top and bottom surfaces and a receiving hole into which the fastener is inserted, the fastener having a body comprising:
    a first right cylinder and a second cylinder that are joined end-to-end such that their axes are inclined relative to each other; and
    a threaded bore passing through both cylinders such that the bore axis is aligned with the axis of the second right cylinder;
    wherein the axis of the second right cylinder is perpendicular to the panel.

15. A fastener as defined in claim 14, wherein the first cylinder is inclined in a range between 5° and 60° relative to the second cylinder.

16. A fastener for use in attaching fixtures to a panel, the panel having parallel top and bottom surfaces and a bore that passes therethrough at an angle to the top and bottom panel surfaces and that receives the fastener, the fastener comprising:
    a body having a bore that passes through the body such that the fastener bore is oriented perpendicular to the top and bottom panel surfaces when the fastener body is received in the panel bore, the body further having an inclined cylindrical portion and a vertical cylindrical portion, wherein the inclined cylindrical portion has an angle of inclination relative to the top and bottom panel surfaces that is substantially equal to the angle of the panel bore and the vertical cylindrical portion projects perpendicularly from the panel when the fastener body is received in the panel bore.

17. A method of using a fastener to attach a threaded bolt to a panel having parallel top and bottom surfaces, the method comprising the steps of:
    boring a receiving hole in the panel at an inclined angle to the top and bottom surfaces;
    providing a fastener that includes a body comprising an inclined cylinder and a straight cylinder that are joined end-to-end, the fastener having top and bottom end surfaces and a threaded bore therethrough, wherein the axis of the inclined cylinder is inclined relative to the axis of the threaded bore and is aligned with the axis of the receiving hole;
    inserting the fastener into the receiving hole; and
    threading the bolt into the threaded bore, wherein the fastener is prevented from rotating in the receiving hole when the bolt is threaded into the bore by the receiving hole acting against the fastener body.

18. A method as defined in claim 17, wherein the step of providing a fastener includes the steps of:
    providing a raised annular wall that projects upwardly from the top end of the fastener body about a longitudinal axis and that forms a recess, the wall having slots that extend perpendicular to the longitudinal axis of the wall;
    providing an internally threaded nut that includes projecting tabs that fit into the slots and prevent rotation of the nut in the recess; and
    the step of inserting the fastener into the receiving hole includes the step of inserting the threaded nut into the recess of the raised annular wall.

* * * * *